United States Patent [19]

Huver et al.

[11] Patent Number: 5,434,230
[45] Date of Patent: Jul. 18, 1995

[54] COMPOSITION CONTAINING OLEFINICALLY UNSATURATED COMPOUNDS AND HYDRAZONES

[75] Inventors: Thomas Huver, Duesseldorf; Petra P. Kremeyer, Essen; Wolfgang Klauck, Meerbush; Christian Nicolaisen; Lothar Kammer, both of Ronnenberg, all of Germany

[73] Assignee: Henkel Kommanditgesellschaft auf Aktien, Duesseldorf, Germany

[21] Appl. No.: 185,987
[22] PCT Filed: Jul. 3, 1991
[86] PCT No.: PCT/EP92/01506
§ 371 Date: Jan. 11, 1994
§ 102(e) Date: Jan. 11, 1994
[87] PCT Pub. No.: WO93/01218
PCT Pub. Date: Jan. 21, 1993

[30] Foreign Application Priority Data

Jul. 12, 1991 [DE] Germany .................. 41 23 194.5

[51] Int. Cl.6 ............................................. C08F 2/00
[52] U.S. Cl. ................................. 526/219.2; 526/141; 526/194
[58] Field of Search ............... 526/219.2, 141, 194

[56] References Cited

U.S. PATENT DOCUMENTS

| | | | |
|---|---|---|---|
| 4,010,152 | 3/1977 | MacLeay et al. | 260/192 |
| 4,063,012 | 12/1977 | MacLeay et al. | 526/219 |
| 4,112,146 | 9/1978 | Lazear | 427/54 |
| 4,855,373 | 8/1989 | Wolf et al. | 526/218.1 |

FOREIGN PATENT DOCUMENTS 4000776 7/1991 Germany .
9110687 7/1991 WIPO .

OTHER PUBLICATIONS

"ullmann, Encyklopaedie der technischen Chemie", 4th Edition, vol. 23 (1983), 421 to 424.
Ber. 47 (1914), 3277 to 3291.
K. H. Pausacker, J. Chem. Soc. 1950, 3478 to 3481.
R. Criegee et al. in Ber. 84 (1951), 219 to 224.
W. Kern, Makromol. Chem. 1, 249 (1947).
C. Srna, Angew, makromol. Chem. 9, 165 (1969).
Houben-Weyl "Methoden der organischen Chemie", vol. 14/1, 263 to 297.
Houben-Weyl, "Methoden der organischen Chemie", vol. X/2.
Houben-Weyl, Bd. 7/26, pp. 1954–1956.

Primary Examiner—Joseph L. Schofer
Assistant Examiner—N. Sarofim
Attorney, Agent, or Firm—Wayne C. Jaeschke; John Daniel Wood; Daniel S. Ortiz

[57] ABSTRACT

Compositions containing a radical-polymerizable olefinically unsaturated compound and a hydrazone of an aromatic aldehyde or ketone are provided. Also provided are methods for the production of such compositions and methods for the use of such compositions as an adhesive and sealing compound or its use for the coating and production of plastic moldings. The compositions polymerize radically at room temperature upon exposure to ambient air.

28 Claims, No Drawings

COMPOSITION CONTAINING OLEFINICALLY UNSATURATED COMPOUNDS AND HYDRAZONES

BACKGROUND OF THE INVENTION

1. Field of the Invention

This invention relates to a composition containing a radical-polymerizable olefinically unsaturated compound and a hydrazone of an aromatic aldehyde or ketone. The invention also relates to its production and to its use as an adhesive and sealing compound and to its use for the coating and production of plastic moldings. The compositions according to the invention polymerize radically at room temperature.

2. Discussion of Related Art

For curing by peroxides or hydroperoxides, olefinically unsaturated systems require selected initiators or activator systems particularly when the reaction is to be initiated at low temperatures, for example at room temperature or only slightly elevated temperatures. For example, it is known that selected tertiary amine compounds with partial aromatic substitution at the N atom perform such an activating function. Known activators for initiating polymerization, for example with dibenzoyl peroxide, are in particular dimethyl aniline and dimethyl-p-toluidine.

A totally different known class of activators for oxidatively initiating the polymerization of certain unsaturated systems, namely drying oils, are metal compounds—at least partly soluble in the system—of metals which can occur in several valency stages and which accelerate the initiation reaction via intermediately occurring valency shifts on interaction with other components of the system. Metal compounds of such metals which are adequately soluble in organic solvents and/or in binders have long been known as so-called drying agents for the air drying of paints, varnishes and the like based on unsaturated oils. Sufficiently oil-soluble compounds of transition metals which are capable of occurring in several valency stages are particularly suitable for this purpose. The individual components differ considerably in their ability to accelerate hardening. Compounds of cobalt and/or manganese are particularly suitable, although iron also has an accelerating effect on curing. In addition, comparable compounds of other metals, which are also capable of developing several valency stages, may be used, particularly in combination with these highly effective metallic components. A detailed description of such systems can be found, for example, in "Ullmann, Encyklopädie der technischen Chemie", 4th Edition, Vol. 23 (1983), 421 to 424.

U.S. Pat. Nos. 4,010,152 and 4,063,012 describe the (co)polymerization of ethylenically unsaturated monomers, such as vinyl chloride, with selected aliphatic alphahydroperoxy)-azo compounds or salts thereof which, on the basis of the structural formulae provided, may be assigned to the class of hydrazone derivatives and which may be regarded as selected hydrazone peroxides. According to the teaching of the first of these two documents, they are prepared by reaction of alpha-halo-azo compounds with sodium peroxide or hydrogen peroxide in the presence of acid acceptors and are said then to be used to initiate polymerization. The majority of the Examples of this document and the parallel second U.S. patent cited above describe the production of the hydroperoxide compounds by a method which is not explained in detail in the general description of the invention. The particular hydrazone compounds selected are dissolved in a solvent and aerated with a stream of oxygen by passing the oxygen through the solution of hydrazone compounds kept at room temperature or at slightly elevated temperatures. The particular hydroperoxides are obtained in yields of 80% or more and are optionally purified by low-temperature crystallization. The hydroperoxides may be used as initiator systems for the polymerization of, for example, vinyl chloride or unsaturated polyester/styrene resins.

A number of earlier publications is concerned with compounds of this type and with their formation, in particular by autoxidation. In 1914, M. Busch et al. described the autoxidation of hydrazones in Ber. 47 (1914), 3277 to 3291. The alleged formation of the peroxides is formulated here as the addition of an oxygen molecule onto the C:N double bond of the hydrazone to form a four-membered peroxide ring. The autoxidation of phenyl hydrazones is also described in K. H. Pausacker, J. Chem. Soc. 1950, 3478 to 3481. This Article discusses the non-catalyzed reaction of pure phenyl hydrazines and the corresponding reactions with addition of a small quantity of benzoyl peroxide as a catalyzed reaction. A more detailed structural elucidation of the constitution of hydrazone peroxides is provided by R. Criegee et al. in Ber. 84 (1951), 219 to 224 where it is shown that the hydrazone peroxides can only be formed from derivatives of hydrazine compounds which still contain a hydrogen atom at the substituted N atom, at least at room temperature or correspondingly low temperatures.

U.S. Pat No. 4,855,373 describes trifunctional hydrazones, namely aliphatic and aromatic hydrazones of 1,3,5-tris-acetyl benzene, as an initiator for the polymerization of vinyl compounds. Acrylic acid and acrylic acid amides and esters with $C_{1-4}$ alcohols are preferably polymerized with 1,3,5-tris-(acetyl-t-butylhydrazonyl)-benzene. The polymerization takes place in the presence or absence of atmospheric oxygen, its removal being preferred. The acrylic acid, of which the aqueous solution has been purged with nitrogen, polymerizes in 30 seconds on addition of a hydrazone solution (see Example 1). If the solution is not purged with nitrogen, no polymerization takes place for 2 minutes, but presumably does proceed in the event of subsequent purging with nitrogen. Accordingly, polymerization begins immediately after the vinyl monomers and the hydrazone compounds have been mixed.

Earlier patent application DE 40 00 776 describes hydrazone compounds corresponding to the following general formula as an initiator or as the principle component of an initiator system for curing olefinically unsaturated compounds by radical polymerization with ambient air:

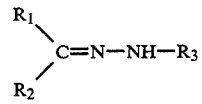

in this formula, $R_1$, $R_2$ and $R_3$ are at least partly the same or different and have the following meanings:

$R_1$ is a linear, branched or cyclic and optionally substituted alkyl radical or an optionally substituted aryl radical, $R_2$ is hydrogen, a linear, branched or cyclic and optionally substituted alkyl radical or an optionally substituted aryl radical;

$R_1$ and $R_2$ together with the co-substituted carbon atom may also form a cycloaliphatic radical which may even be substituted, $R_3$ is a linear, branched or cyclic and optionally substituted alkyl radical or an optionally substituted aryl radical.

DESCRIPTION OF THE INVENTION

The problem addressed by the invention was to use the established knowledge described above to develop new possibilities for the practical use of initiators or activators and activator systems which could be used in a simplified manner to initiate the polymerization of olefinically unsaturated systems. In admixture with radical-polymerizable compounds or mixtures, the activators would be capable of activation by exposure to ambient air. In preferred embodiments, the activators would be activated at temperatures as low as room temperature, although they could also be activated at slightly elevated temperature. One particularly important aspect of the invention is concerned with multi-component systems of the type mentioned which are capable of initiating the start of a radical polymerization of unsaturated systems simply by exposure to ambient air at room temperature—with timed curing and a pre-determined pot life. In one important embodiment, the invention seeks in particular to provide one-component storable systems which are plastic, more particularly paste-like to fluid, in the form in which they are applied and which have a sufficient pot life for processing, but which subsequently cure in dimensionally stable form simply by exposure to ambient air.

The solution provided by the invention is characterized in the claims. It is based on a knowledge of the measures with which the polymerization of the composition can be controlled in such a way that, on the one hand, the composition can be stored at room temperature and, on the other hand, it can readily be polymerized at any desired time. This is because, in the substantial absence of radical-forming agents, such as oxygen, peroxides, hydroperoxides, etc., the composition is stable in storage, i.e. no polymerization takes place for at least 2 months and preferably for at least 12 months at room temperature, as reflected in the virtually unchanged viscosity. The composition is at least still useable for the particular application envisaged. However, polymerization is initiated by simple exposure to air at ambient temperature or elevated temperature and is completed in an acceptable time. Accordingly, one-component adhesives, sealing compounds, coating compounds and molding compounds can be produced and stored with virtually no loss of activity. The open time of the system required for processing by forming may largely be freely selected. Accordingly, the compositions according to the invention are of considerable practical significance in many fields of application.

Accordingly, the present invention relates to a storable composition containing a radical-polymerizable olefinically unsaturated compound and a hydrazone corresponding to the following general formula

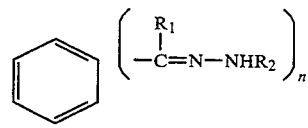

in which n is a number of 1 to 3, $R_1$ is hydrogen or an alkyl group containing up to 40 carbon atoms and $R_2$ independently of the other substituents is hydrogen or an aromatic or aliphatic group containing up to 40 carbon atoms.

The "olefinically unsaturated compounds" include any acyclic and cyclic aliphatic hydrocarbons containing one or more reactive double bonds in the molecule. More particularly, they include any vinyl monomers and, in addition, acrylic acid, methacrylic acid, styrene and butadiene and derivatives thereof. They may also be completely or partly present in the form of reactive preformed oligomer and/or polymer compounds. Monomers or oligomers containing free carboxylic acid groups are particularly preferred.

The hydrazone compounds according to the invention are monofunctional, difunctional and trifunctional. The trifunctional compounds are preferred. The substituents $R_1$ and $R_2$ are preferably linear and/or cyclic alkyl groups containing up to 40 carbon atoms and, more particularly, 3 to 8 carbon atoms. At least one substituent $R_2$ per molecule should be such an alkyl group. The substituents $R_1$ and $R_2$ may be unsubstituted or substituted. It is important in this regard to bear in mind the fact that, by the substitution of these radicals, more particularly the radical $R_2$, a certain influence can be exerted on the reactivity of the activator system. If, for example, an aromatic system, more particularly a phenyl radical, is present, suitable substitution of this phenyl radical enables the reaction to be accelerated by the provision of electron-shifting substituents known per se at this phenyl radical in $R_2$. The relevant prior art cited above provides clear references to this effect, see for example the literature reference Pausacker loc. cit., page 3480, Table. Electron-shifting and hence reaction-accelerating substituents are, for example., alkyl, alkoxy and/or halogen substituents at the phenyl radical in $R_2$. Conversely, strongly electron-attracting substituents of the $NO_2$ group type have a decelerating effect on the reaction. Electron-shifting and electron-attracting effects such as these by substitution and the structure of the particular substituents are general knowledge among experts.

The substituent $R_1$ in the general formula can also influence the velocity of the reaction through the choice of the particular constitution and any substitution envisaged. The relevant literature cited in the foregoing is again worth consulting in this regard, cf. the cited Article by Criegee et al. loc. cit., page 222, and the literature cited in connection with the Table.

The above-cited U.S. Pat. No. 4,010,152 with its formula diagrams in columns 6 to 14 provides an insight into the extraordinary many-sidedness of the special character of the substituents $R_1$ and $R_2$ in the compounds corresponding to the general formula. The hydrazone compounds are shown in the form of their hydroperoxides which are also formed in accordance with the invention on exposure to air where the reaction is carried out in situ. The detailed particulars provided in the document in question on the particular character of the hydrazone compounds or rather the hydroperoxides formed in situ therefrom apply to the teaching according to the invention in connection with the definition of the compounds corresponding to the general formula. For reasons of expediency, reference is made to this detailed printed description in connection with the disclosure of the present invention. The benzene ring may of course contain other substituents providing they do not affect the starting function. Specific examples are acetophenone methyl hydrazone ($n=1$, $R_1=R_2=CH_3$), acetophenone-t-butyl hydrazone ($n=1$, $R_1=CH_3$, $R_2=C(CH_3)_3$).

The preferred hydrazone is 1,3,5-tris-(acetylalkylhydrazone)-benzene.

As already mentioned, particular importance is attributed to the significance of the composition for the intended polymerization, particularly in regard to storage. According to the invention, the oxygen can be removed by degassing. To this end, the homogenized composition is preferably exposed to a vacuum of 0.5 torr for 2 to 5 minutes at approximately $-196°$ C. without the hydrazone and is then heated to room temperature. Residual oxygen is removed from the system by multiple repetition of this freezing/thawing cycle. A simple and simulated practical method is to store the composition at 80° C. in the absence of air. After 24 hours, no polymerization should have occurred. Degassing may also be carried out by other methods, for example ultrasonically or chemically.

It is known that olefins and other unsaturated compounds, more particularly polymerizable monomers, have to be stabilized for storage. The following basic reactions are used for this purpose:

1. stabilization against oxygen by addition of antioxidants and
2. stabilization against radicals by addition of radical inhibitors.

From general chemical knowledge, typical stabilizer components are listed in the following, the mechanism to which the stabilizer is to be assigned being indicated in brackets after the particular compound: pyrogallol (1), $O_2$-inhibited acrylates (1), hydroquinone (1,2), hydroquinone monomethyl ether (1,2), butyl hydroxytoluene (2) and phenothiazine (2). Deoxidizers of the triphenyl phosphine type and iodide/iodine solutions are of particular importance for stabilizing the system against unwanted premature reaction. The quantity in which they are used is adapted to the particular application involved. It may readily be determined in individual cases by relevant considerations and/or by preliminary tests. Quite generally, the percentage by weight of stabilizers is at most 5% by weight and preferably from 0.01 to 1% by weight, based on the composition as a whole. An excessive quantity retards the desired polymerization on exposure to air.

The composition according to the invention also preferably contains an addition of metal compounds which can occur in several valency stages. Selected representatives of the transition metals can be particularly active in this regard. The particular choice of the metal can determine inter alia the rate at which the polymerization reaction is initiated. Components highly active at room temperature are derived, for example, from copper, cobalt, vanadium and/or manganese. However, particular significance is attributed to compounds of iron which have a good accelerating effect on the reaction. Iron, cobalt and/or manganese compounds are particularly suitable for use at room temperature, which is of particular advantage for many applications, optionally being used in admixture with other metallic components, such as compounds of lead, cerium, calcium, barium, zinc and/or zirconium. The relevant specialist literature may be consulted in this regard, cf. for example the cited publication in "Ullmann" loc. cit. and the literature cited therein. The metals in question are used in the form of such as compounds that they are at least partly soluble in the system as a whole. Both soap-like metal compounds and other types otherwise bonded to organic radicals, particularly in complex form, are suitable. A typical example of the procedure adopted in accordance with the invention is the use of corresponding metal naphthenates or metal acetyl acetonates. If, however, inorganic salts are sufficiently soluble in the system, it is also possible to use such inorganic systems. A typical example of this is iron chloride which has a distinct accelerating effect when used in the system according to the invention. It may be advisable to use the metal compounds in a low valency stage of the metal, i.e. for example as cobalt (II) or manganese (II). In other cases, the metal compound may be used in a higher valency stage of the metal. For example, iron may also be used in the form of $Fe^{3+}$ compounds.

The activator components of the type in question, which are optionally used in accordance with the invention, are the various mixture components with a reducing effect which are used in typical redox systems for initiating polymerization reactions. Reference is made in this regard to the extensive relevant literature, for example W. Kern, Makromol. Chem. 1, 249 (1947) and C. Srna, Angew. makromol Chem. 9, 165 (1969), and also to general specialist knowledge as described, for example, in Houben-Weyl "Methoden der organischen Chemic", Vol. 14/1, 263 to 297. The class of alpha-hydroxyketones as represented, for example, by butyroin, benzoin of acetoin has proved to be particularly active in this regard. However, the teaching according to the invention is by no means limited to this particular class. Reference is made to the modifications illustrated in the Examples according to the invention. What is crucial is that, although this class of compounds is capable of performing an important reaction-accelerating function in the activator systems used in accordance with the invention, their use is not compulsory.

Initiators or activator systems from the principal components described in the foregoing, namely hydrazone compound, at least partly soluble metallic drying agent and/or any accelerator used, are all capable after adsorbing ambient air of initiating the radical-polymerizable olefinically unsaturated systems which, hitherto, have been used with various and, in particular peroxidic, initiator systems.

Definitions of the other constituents of the composition according to the invention can be found in the relevant literature concerned with the production and processing of systems based on olefinically unsaturated, radical-polymerizable compounds. An extremely large number of systems of this type tailored in their properties to suit the particular application are now available among experts. Olefinically unsaturated reactive systems can be built up on the basis of selected radical-polymerizable ethylenically unsaturated compounds or on the basis of mixtures of several types of such compounds. The ethylenically unsaturated polymerizable components may be monofunctional compounds and/or polyfunctional reactive components.

The polymerization reaction can actually be carried out with non-thickened composition, i.e. for example with the pure monomer mixture. In that case, the viscosity is in the range from about 1 to 5 mPa.s. However, the composition selected should preferably have an initial viscosity of at least about 30 to 100 mPa.s and preferably of at least about 200 or 300 mPa.s. Particularly safe initiation of the polymerization reaction can be expected in the case of systems having an initial viscosity of at least about 500 mPa.s and, more particularly, of at least about 1,000 mPa.s. All these viscosity values are determined as Brookfield viscosities. Commercially available adhesive systems are known to have viscosities of at least about 3,000 mPa.s and, more particularly, up to about 10,000 mPa.s. Materials of this type are of course eminently suitable for processing in accordance With the invention. However, the invention is by no means limited to such materials. Systems of much lower viscosity, for example spreadable lacquer systems, which are used in particular as solventless systems, are also suitable for the reaction-initiating mechanism described herein providing the material to be processed by forming has the minimum initial viscosity values mentioned above. The same also applies to other applications, for example the production of plastic moldings based on styrene/unsaturated polyester resins. The necessary initial viscosity values can be adjusted in particular by mixtures having an adequate content of oligomeric and/or polymeric components, optionally in admixture with low molecular weight, unsaturated components liquid at room temperature, such as (meth)acrylates. However, correspondingly, viscous compositions can also consist solely of precondensates of suitable fluidity. The extensive knowledge of experts on such ethylenically unsaturated mixtures curable by radical polymerization is applicable in this regard.

The multicomponent mixtures to be used in accordance with the invention are generally formulated as onecomponent systems which are protected against contact with air pending their use. However, they may also be formulated as multicomponent systems, in which case the components are mixed together for the practical application of the system. The open pot life of the system can be regulated by suitably selecting and adapting the principal components of the activator system, so that in this case, too, the start of the initiation reaction and, ultimately, the curing of the system can take place in air under ambient conditions. In one embodiment of the invention, the multicomponent mixtures in question of the activator system and polymerizable components are present as two-component systems which do not react even on contact with air. In this case, it is particularly preferred to separate the main components of the activator systems used in accordance with the invention from one another in such a way that the hydrazone compound is kept separate from the metal compounds. Both components may thus generally contain ethylenically unsaturated reactive mixture. For processing, the two separately stored components merely have to be mixed, processed by forming during the open pot life of the system and finally exposed to air.

The invention provides for the formulation of optimized mixtures. Without in any way departing from the scope of the invention, soluble and/or insoluble fillers, elasticizing agents, thickeners, thixotropicizing agents, pigments, coupling agents and the like may be used with no adverse affect on the performance of the initiator system according to the invention. This does of course presuppose that any problems in the interaction of the starter components are safely ruled out by suitably selecting the auxiliaries and fillers. General chemical knowledge may be applied to this end.

In the multicomponent mixtures according to the invention, the starter mixtures preferably make up no more than about 15% by weight and, in particular, no more than about 10% by weight, based on the weight of the system as a whole. Depending on the activity of the components used, the weight of the starter mixture can be reduced very considerably, for example to around 0.1% by weight or to at least about 0.5% by weight. Quantities of the starter system of at least about 1% by weight are particularly preferred, quantities of up to about 8% by weight being especially suitable. All these figures are based on the one hand on the total weight of the composition according to the invention and on the total weight of the three main components of the starter system.

The three above-mentioned components of the starter system may advantageously be used in the following quantities (in % by weight, based on the system as a whole):

hydrazone compounds: at least about 0.1% by weight, preferably 0.5 to 7.5% by weight and more preferably 1 to 4% by weight soluble metal compound: 0 to 5% by weight, preferably 0,005 to 1% by weight and more preferably 0.1 to 5% by weight deoxidizer: 0 to 5% by weight and preferably 0.01 to 1% by weight.

Mixtures of oligomers and/or polymers together with ethylenically unsaturated monomers of low molecular weight are used as the mixtures of radical-polymerizable compositions suitable for a wide variety of practical applications. The relatively high molecular weight components of the mixtures are often at least partly soluble in the monomers. Mixtures of this type are particularly suitable for processing in accordance with the invention. The content of monomers, for example of the (meth)acrylate, optionally substituted styrene and/or acrylonitrile type, is generally at least 10% by weight and preferably at least about 20% by weight and in many cases, may even be at least about 40% by weight (based on the reactive mixture as a whole). The monomer component may be by far the predominant component in terms of weight, so that for example 60 to 80% by weight of the mixture as a whole can be made up by the low molecular weight monomer. As previously explained, however, it is important to bear in mind the fact that the use of an adequate quantity of compounds of relatively high molecular weight and/or other thickening agents guarantees the at least slightly increased initial viscosity of the mixtures for safely initiating the reaction on exposure to air.

In characteristic examples of application, which fall within the scope of the invention as preferred embodiments, these conditions of use are guaranteed in any event. Without any claim to completeness, the following examples are mentioned here: aerobically curing sealing and adhesive systems, spreadable compositions for surface coating with polymerizable, more particularly solventless lacquers and paints in the form of spreadable air-drying lacquer systems and the production of molded articles with initiation of the reaction by exposure to ambient air, for example based on styrene-/unsaturated polyester resins.

EXAMPLES

For the following Examples, the ethylenically unsaturated compounds (also referred to hereinafter as monomers) are freed from any inhibitors present and, where possible, purified by distillation. In the case of low-volatility, non-distillable monomers, dissolved oxygen was removed by evacuation and subsequent purging with nitrogen for several hours. The monomers were stored in an inert gas (nitrogen or argon) and removed.

The hydrazones were prepared by methods known from the literature (see, for example, Houben-Weyl, "Methoden der organischen Chemie", Vol. X/2), stored in a an inert gas and removed.

To determine the cure time of the polymerizable multicomponent mixtures, 100 mg of the mixture formulated in an inert gas atmosphere was exposed to ambient air in a watchglass. The mixture is regarded as cured when the total quantity of sample has changed into a thermoplastic or thermoset solid.

For bonding, test specimens corresponding to DIN 53 281 are provided with the polymerizable mixture and, before fitting together, are exposed to the ambient air for a certain period (90 to 600 seconds).

The tensile shear tests are carried out in accordance with DIN 53283 on single overlap (250 mm$^2$) specimens.

To determine the storage time, approx. 7 g of the composition were introduced by syringe in the absence of oxygen into commercially available argon-filled adhesive tubes of an Al alloy approximately 1 cm in diameter and approximately 8 cm in length. The tubes were closed by means of a tube clamp and stored at the temperatures indicated. From time to time, the viscosity was visually examined for any significant change. If this is not the case, the composition is regarded as stable in storage.

The following general procedure was used for the Examples:

The monomer was initially introduced into a nitrogen-filled multiple-necked flask and the thickener subsequently dissolved therein or a mixture was used from the outset. The metal compound, the activator, the inhibiting stabilizer and a coupling agent were then added, again in the absence of oxygen. The homogenized mixture was cooled to −196° C. and the flask was evacuated to 0.5 torr and subsequently heated to room temperature. Residual oxygen was removed from the system by multiple repetition of this freezing/thawing cycle. The hydrazone compound was then added and the mixture was degassed as described above and stored in an inert gas atmosphere.

Production Example a: Acetophenone methyl hydrazone

The reaction was carried out in the strict absence of oxygen in an inert gas (nitrogen) atmosphere. 27.5 g methyl hydrazine were added dropwise to 75 g acetophenone over a period of 5 minutes, after which the reaction mixture was heated for 6 h to 60° C. 30 g Na$_2$SO$_4$ were then added and the solid was filtered off at room temperature. The solution was then subjected to fractional distillation. Boiling point: 90 to 92° C. (0.8 mbar). Yield 59 g (65%).

Production Example b: Acetophenone t-butyl hydrazone

The reaction was carried out in the strict absence of oxygen in an inert gas (nitrogen) atmosphere. 17.5 g acetophenone, 18.7 g t-butyl hydrazine hydrochloride, 12 g 50% NaOH and 60 ml ethanol were heated for 14 hours to the reflux temperature. 70 ml diethyl ether and 60 ml water were added to the reaction mixture and, after vigorous stirring, the organic phase was removed and washed with 50 ml water. After drying with Na$_2$SO$_4$, the ether was removed in a rotary evaporator and the residue was subjected to fraction distillation. Boiling point: 86° to 89° C. (2 mbar). Yield: 24 g (83%).

The compositions consisted of the following components and were degassed as follows:

|  |  | Example 1 | Example 2 | Example 3 | Comparison I | Example 4 |
|---|---|---|---|---|---|---|
| 1. Components |  |  |  |  |  |  |
| GM 9 | $^{a)}$g | 20 | 20 | 20 | — | 20 |
| GM 1 | $^{b)}$g | — | — | — | 10 | — |
| Fe (acac)$_3$ | $^{c)}$g | 2.6 | — | 2.6 | — | 2.6 |
| BUTYROIN | $^{d)}$g | 0.4 | — | 0.4 | — | — |
| Iodine solution | $^{e)}$ml | 0.5 | 0.5 | 0.5 | — | 0.75 |
| JPA-514 | $^{f)}$g | 0.1 | 0.1 | — | — | 0.1 |
| Methacryloyl hydroxyethyl succinate | $^{g)}$g | — | — | 1 | — | — |
| Acetophenone methyl hydrazone | g | — | — | — | — | 0.6 |
| Acetophenone t-butyl hydrazone | g | 0.78 | — | — | — | — |
| Tris-(acetyl-butyl-hydrazonyl)-benzene | g | — | 0.6 | 0.6 | 0.3 | — |
| 2. Degassing |  |  |  |  |  |  |
| a) Without hydrazone |  | 2 × 4 mins. | 1 × 4 mins. | 2 × 5 mins. | — |  |
| b) With hydrazone |  | 1 × 4 mins. | 1 × 4 mins. | 1 × 5 mins. | — |  |
| Properties of the composition (n.d. not determined) |  |  |  |  |  |  |
| 1. Immediately after production |  |  |  |  |  |  |
| a) Cure time (mins.) |  | 40 | 55 | 35 | 26 | 30 |
| b) Tensile shear strength (n/mm$^2$) |  |  |  |  |  |  |
| Fe (ST1203) |  | 5.1 | 14.3 | 7.6 | n.d. | 25.1 |
| PVC |  | 4.7 | 3.2 | 3.7 | n.d. | 5.0 |
| 2. After 10 days at 50° C. |  |  |  |  |  |  |
| a) Cure time (mins.) |  | 40 | n.d. | 35 | 0 | 37 |
| b) Tensile shear strength (n/mm$^2$) |  |  |  |  |  |  |
| Fe (ST1203) |  | 4.4 | n.d. | 6.7 | n.d. | 17.2 |
| PVC |  | 5.5 | n.d. | 4.7 | n.d. | 4.8 |
| 3. After 20 days |  |  |  |  |  |  |

-continued

|  | Example 1 | Example 2 | Example 3 | Comparison I | Example 4 |
|---|---|---|---|---|---|
| at 50° C. | | | | | |
| a) Cure time (mins.) | n.d. | n.d. | 35 | n.d. | n.d. |
| b) Tensile shear strength (n/mm²) | | | | | |
| Fe (ST1203) | | | 8.0 | | |
| PVC | | | 4.0 | | |
| 4. Stability in storage | | | | | |
| a) at 80° C. (h.) | >2 | >2 | >2 | 0.0 | n.d. |
| b) at room temperature (months) | >2 | <2 | n.d. | 0.0 | >2 |

Footnotes $^{a)}$ to $^{g)}$ on the following page
$^{a)}$Mixture of methyl methacrylate and PLEXIDON M 449 in a ratio by weight of 50:10. PLEXIDON M 449 is a high molecular weight polymethyl methacrylate marketed by Röhm.
$^{b)}$Mixture of methyl methacrylate and PLEXIGUM MB 319 in a ratio by weight of 50:40. PLEXIGUM MB 319 is a methyl methacrylate/ethyl acrylate copolymer marketed by Röhm.
$^{c)}$10% iron(3) acetyl acetonate solution in hydroxypropylene methacrylate
$^{d)}$Hydroxyoctan-4-one, $C_8H_{16}O_2$
$^{e)}$1.7% by weight iodine in tetrahydrofurfuryl methacrylate
$^{f)}$Monomethacryloyloxyethyl phosphate
$^{g)}$Methacryloyloxyethyl succinate Examples 1 to 3 clearly show the superiority of the compositions according to the invention to the comparison composition according to U.S. Pat No. 4,855,379 in terms of controlled polymerization. Initially, they are stable in storage for a period of several months sufficient for practical purposes and then readily cure in one hour on exposure to air, even at room temperature. The strengths obtained satisfy normal requirements. No loss of activity is observed. By contrast, the known composition begins to polymerize immediately after mixing of the components, as stated in the US patent.

We claim:

1. A composition comprising a radical-polymerizable olefinically unsaturated compound and a hydrazone corresponding to the following general formula:

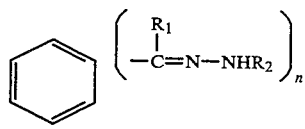

in which
n is a number of 1 to 3,
$R_1$ is hydrogen or an alkyl group containing up to 40 carbon atoms and
$R_2$ independently of the other substituents represents H or an aromatic or aliphatic group containing up to 40 carbon atoms,
wherein said composition is stable in storage.

2. A composition as claimed in claim 1 wherein said radical-polymerizable olefinically unsaturated compound comprises at least one member selected from the group consisting of acrylic acid, methacrylic acid, acrylate compounds, methacrylate compounds styrene, styrene derivatives and acrylonitrile, which members can be completely or partly present in the form of reactive preformed oligomeric or polymeric compounds.

3. A composition as claimed in claim 1 wherein said hydrazone is a 1,3,5-tris-(acetylalkylhydrazone)-benzene.

4. A composition as claimed in claim 1 further comprising a stabilizer against radicals and oxygen.

5. A composition as claimed in claim 4 wherein said stabilizer is selected from the group of triphenyl phosphine and iodide/iodine.

6. A composition as claimed in claim 1 further comprising a metal compound as an activator.

7. A composition as claimed in claim 6 wherein said metal compound is selected from the group of metal compounds derived from a member selected from the group consisting of Fe, Co, Mn, V.

8. A composition as claimed in claim 1 wherein said composition has a viscosity of at least 100 mPa.s.

9. A composition as claimed in claim 1 wherein said composition has a viscosity of at least 300 mPa.s.

10. A composition as claimed in claim 1 wherein said composition has a viscosity of at least 500 mPa.s.

11. A composition as claimed in claim 1 wherein said composition comprises at least 20% by weight, based on the composition as a whole, of said radical-polymerizable olefinically unsaturated compound and at least 0.1% by weight, based on the composition as a whole, of said hydrazone.

12. A composition as claimed in claim 1 wherein said composition comprises at least 40% by weight, based on the composition as a whole, of said radical-polymerizable olefinically unsaturated compound and at least 0.5% to 7.5% by weight, based on the composition as a whole, of said hydrazone.

13. A composition as claimed in claim 1 wherein said composition further comprises 0.01% to 5% by weight of a stabilizer.

14. A composition as claimed in claim 1 wherein said composition further comprises 0.01% to 1% by weight of, a stabilizer.

15. A composition as claimed in claim 1 wherein said composition further comprises 0.005% to 5% by weight, based on the composition as a whole, of a metal compound activator.

16. A composition as claimed in claim 1 wherein said composition further comprises 0.005% to 1% by weight, based on the composition as a whole, of a metal compound activator.

17. A composition as claimed in claim 1 wherein said composition further comprises 0.1% to 0.5% by weight, based on the composition as a whole, of a metal compound activator.

18. A composition as claimed in claim 1 wherein said composition further comprises 10% to 80% by weight of auxiliaries selected from the group consisting of fillers, pigments, thickeners, coupling agents and elasticizers.

19. A composition as claimed in claim 1 wherein said composition further comprises 10 to 50% by weight of auxiliaries selected from the group consisting of fillers, pigments, thickeners, coupling agents and elasticizers.

20. A composition as claimed in claim 1 wherein said composition comprises in percentage by weight, based on the composition as a whole:
(a) at least 40% by weight of the olefinically unsaturated compound;
(b) from 1 to 4% by weight of said hydrazone;
(c) from 0.01 to 1% by weight of at least one stabilizer selected from the group consisting of triphenyl phosphine and iodine; and d from 0 to 0.5% by weight of at least one metal activator compound selected from the group of metal compounds derived from a member selected from the group consisting of Fe, Co, Mn, and V.

21. A composition of claim 20 wherein said hydrazone is a 1,3,5-tris-acetylalkylhydrazone)-benzene.

22. A composition of claim 20 wherein said hydrazone is acetophenone methyl hydrazone.

23. A composition as claimed in claim 1 further comprising a polymer, at least partly dissolved therein, to provide a viscosity above 500 mPa.s.

24. A composition as claimed in claim 1 further comprising a polymer at least partly dissolved therein to provide a viscosity in the range from about 3,000 to 10,000 mPa.s.

25. A composition as claimed in claim 1 wherein said composition is stable in storage in the absence of light.

26. A composition as claimed in claim 1 wherein said composition is stable in storage in the absence of UV light.

27. A method for the production of the composition claimed in claim 1, said method comprising:
   degassing a homogeneous mixture of the constituent components of said composition without said hydrazone,
   heating said homogeneous mixture to room temperature,
   adding said hydrazone to said homogeneous mixture to form a composition as claimed in claim 1, and
   degassing said composition as claimed in claim 1.

28. A method as claimed in claim 27 wherein said degassing of said homogeneous mixture without said hydrazone and said degassing of said composition are each performed by placing said homogeneous mixture without said hydrazone and said composition of claim 1 under a vacuum of 0.5 torr for about 3 minutes at $-196°$ C.

* * * * *